(12) United States Patent
Adler et al.

(10) Patent No.: US 10,911,261 B2
(45) Date of Patent: Feb. 2, 2021

(54) METHOD, APPARATUS AND SYSTEM FOR HIERARCHICAL NETWORK ON CHIP ROUTING

(71) Applicant: Intel Corporation, Santa Clara, CA (US)

(72) Inventors: Robert P. Adler, Santa Clara, CA (US); Lichen Weng, Milpitas, CA (US); Christopher C. Gianos, Sterling, MA (US)

(73) Assignee: Intel Corporation, Santa Clara, CA (US)

( * ) Notice: Subject to any disclaimer, the term of this patent is extended or adjusted under 35 U.S.C. 154(b) by 870 days.

(21) Appl. No.: 15/383,032

(22) Filed: Dec. 19, 2016

(65) Prior Publication Data

US 2018/0176118 A1 Jun. 21, 2018

(51) Int. Cl.
*H04L 12/46* (2006.01)

(52) U.S. Cl.
CPC ........ *H04L 12/462* (2013.01); *H04L 12/4625* (2013.01)

(58) Field of Classification Search
None
See application file for complete search history.

(56) References Cited

U.S. PATENT DOCUMENTS

| | | | |
|---|---|---|---|
| 5,493,566 A | 2/1996 | Ljungberg et al. | |
| 6,009,488 A | 12/1999 | Kavipurapu | |
| 6,233,632 B1 | 5/2001 | Meiyappan et al. | |
| 6,330,647 B1 | 12/2001 | Jeddeloh et al. | |
| 6,427,169 B1 | 7/2002 | Elzur | |
| 6,430,182 B1 | 8/2002 | Oyama | |
| 6,469,982 B1 | 10/2002 | Henrion et al. | |
| 6,611,893 B1 | 8/2003 | Lee et al. | |
| 6,694,380 B1 | 2/2004 | Wolrich et al. | |
| 6,725,313 B1 | 4/2004 | Wingard et al. | |
| 6,810,460 B1 | 10/2004 | Kirkwood | |
| 6,816,938 B2 | 11/2004 | Edara et al. | |

(Continued)

FOREIGN PATENT DOCUMENTS

| | | |
|---|---|---|
| CN | 1819555 | 8/2006 |
| CN | 1833415 | 9/2006 |

(Continued)

OTHER PUBLICATIONS

Intel Corporation, "An Introduction to the Intel QuickPath Interconnect," Jan. 2009, pp. 1-22.

(Continued)

*Primary Examiner* — Jason E Mattis
*Assistant Examiner* — Hong Shao
(74) *Attorney, Agent, or Firm* — Trop, Pruner & Hu, P.C.

(57) ABSTRACT

In an embodiment, a system on chip includes: a plurality of local networks having one or more local endpoints and a first router, where at least some of the one or more local endpoints of different local networks have non-unique port identifiers; at least one global network having one or more global endpoints and at least one second router, where the one or more global endpoints have unique port identifiers; and a plurality of transparent bridges to couple between one of the plurality of local networks and the at least one global network. Other embodiments are described and claimed.

17 Claims, 17 Drawing Sheets

(56) References Cited

U.S. PATENT DOCUMENTS

| | | |
|---|---|---|
| 7,065,733 B2 | 6/2006 | Goodnow et al. |
| 7,415,533 B1 | 9/2008 | Lacroute et al. |
| 7,421,543 B2 | 9/2008 | Suzuki |
| 7,457,905 B2 | 11/2008 | Gehman |
| 7,506,089 B2 | 3/2009 | Cho et al. |
| 7,573,295 B1 | 8/2009 | Stadler |
| 7,613,902 B1 | 11/2009 | Martin et al. |
| 7,673,087 B1 | 3/2010 | Ansari et al. |
| 7,685,346 B2 | 3/2010 | Teh |
| 7,723,902 B2 | 5/2010 | Mandhani et al. |
| 7,734,856 B2 | 6/2010 | Reinig |
| 7,783,819 B2 | 8/2010 | Mandhani |
| 7,793,345 B2 | 9/2010 | Weber et al. |
| 7,873,068 B2 | 1/2011 | Klinglesmith et al. |
| 7,979,592 B1 | 7/2011 | Pettey et al. |
| 7,990,999 B2 | 8/2011 | Lee |
| 8,010,731 B2 | 8/2011 | Mandhani |
| 8,023,508 B2 | 9/2011 | Horton |
| 8,069,286 B1 | 11/2011 | Orthner et al. |
| 8,199,157 B2 | 6/2012 | Park et al. |
| 8,225,019 B2 | 7/2012 | Asnaashari |
| 8,286,014 B2 | 10/2012 | Han et al. |
| 8,364,874 B1 | 1/2013 | Schlansker et al. |
| 8,437,369 B2 | 5/2013 | Shaikli |
| 8,443,422 B2 | 5/2013 | Weber et al. |
| 8,711,875 B2 | 4/2014 | Lakshmanamurthy |
| 8,713,234 B2 | 4/2014 | Lakshmanamurthy |
| 8,713,240 B2 | 4/2014 | Lakshmanamurthy |
| 8,775,700 B2 | 7/2014 | Lakshmanamurthy |
| 8,805,926 B2 | 8/2014 | Lakshmanamurthy |
| 8,874,976 B2 | 10/2014 | Lakshmanamurthy |
| 8,929,373 B2 | 1/2015 | Lakshmanamurthy |
| 8,930,602 B2 | 1/2015 | Lakshmanamurthy |
| 9,021,156 B2 | 4/2015 | Lakshmanamurthy |
| 9,053,251 B2 | 6/2015 | Lakshmanamurthy |
| 2002/0038401 A1 | 3/2002 | Zaidi |
| 2003/0088722 A1 | 5/2003 | Price |
| 2003/0126336 A1 | 7/2003 | Creta |
| 2003/0227926 A1 | 12/2003 | Ramamurthy et al. |
| 2004/0177176 A1 | 9/2004 | Li et al. |
| 2004/0218600 A1 | 11/2004 | Mehdi et al. |
| 2005/0010687 A1 | 1/2005 | Dai |
| 2005/0177664 A1 | 5/2005 | Cho et al. |
| 2005/0120323 A1 | 6/2005 | Goodnow et al. |
| 2005/0137966 A1 | 6/2005 | Munguia et al. |
| 2005/0289369 A1 | 12/2005 | Chung et al. |
| 2005/0289374 A1 | 12/2005 | Kim et al. |
| 2006/0047849 A1 | 3/2006 | Mukherjee |
| 2006/0101179 A1 | 5/2006 | Lee et al. |
| 2006/0140126 A1 | 6/2006 | Zhong |
| 2006/0218336 A1 | 9/2006 | Ishizawa et al. |
| 2007/0006108 A1 | 1/2007 | Bueti |
| 2007/0067549 A1 | 3/2007 | Gehman |
| 2008/0059441 A1 | 3/2008 | Gaug et al. |
| 2008/0082840 A1 | 4/2008 | Kendall et al. |
| 2008/0147858 A1 | 6/2008 | Prakash et al. |
| 2008/0163005 A1 | 7/2008 | Sonksen et al. |
| 2008/0235415 A1 | 9/2008 | Clark et al. |
| 2008/0288689 A1 | 11/2008 | Hoang et al. |
| 2008/0310458 A1 | 12/2008 | Rijpkema |
| 2009/0006165 A1 | 1/2009 | Teh |
| 2009/0119432 A1 | 5/2009 | Lee et al. |
| 2009/0235099 A1 | 9/2009 | Branover et al. |
| 2009/0248940 A1 | 10/2009 | Marino et al. |
| 2009/0249098 A1 | 10/2009 | Han et al. |
| 2009/0296624 A1 | 12/2009 | Ryu et al. |
| 2009/0296740 A1 | 12/2009 | Wagh |
| 2009/0300245 A1 | 12/2009 | Shoemaker et al. |
| 2009/0310616 A1 | 12/2009 | Cummings et al. |
| 2010/0199010 A1 | 8/2010 | Goren et al. |
| 2010/0022070 A1 | 9/2010 | Farrugia et al. |
| 2010/0220703 A1 | 9/2010 | Farrugia et al. |
| 2010/0235675 A1 | 9/2010 | Subramanian et al. |
| 2010/0246594 A1 | 9/2010 | Klinglesmith et al. |
| 2010/0262855 A1 | 10/2010 | Buch et al. |
| 2010/0293304 A1 | 11/2010 | Alexandron et al. |
| 2010/0312942 A1 | 12/2010 | Blinick et al. |
| 2011/0032947 A1 | 2/2011 | Brueggen |
| 2011/0047272 A1 | 2/2011 | Bosneag |
| 2011/0078315 A1 | 3/2011 | Matsushita et al. |
| 2011/0078356 A1 | 3/2011 | Shoemaker |
| 2011/0093576 A1 | 4/2011 | Cherian et al. |
| 2011/0179248 A1 | 7/2011 | Lee |
| 2011/0238728 A1 | 9/2011 | Nagarajao et al. |
| 2012/0051297 A1 | 3/2012 | Lee et al. |
| 2012/0066468 A1 | 3/2012 | Nakajima et al. |
| 2012/0079590 A1 | 3/2012 | Sastry et al. |
| 2012/0233514 A1 | 9/2012 | Patil et al. |
| 2012/0303842 A1 | 11/2012 | Cardinell et al. |
| 2012/0303899 A1 | 11/2012 | Ash et al. |
| 2012/0311213 A1 | 12/2012 | Bender et al. |
| 2013/0054845 A1 | 2/2013 | Nimmala et al. |
| 2013/0089095 A1 | 4/2013 | Chen et al. |
| 2014/0359044 A1* | 12/2014 | Davis .................. H04L 45/60 709/213 |
| 2015/0019788 A1* | 1/2015 | Adler .................. G06F 13/366 710/313 |
| 2015/0222452 A1* | 8/2015 | Ng .................. H04L 12/6418 370/392 |
| 2015/0222533 A1* | 8/2015 | Birrittella .............. H04L 45/66 370/392 |
| 2016/0034411 A1* | 2/2016 | Smith ................ G06F 13/4022 710/116 |
| 2016/0140070 A1* | 5/2016 | Araujo ............... G06F 13/4027 710/310 |

FOREIGN PATENT DOCUMENTS

| | | |
|---|---|---|
| CN | 101558589 | 10/2009 |
| CN | 101873339 | 10/2010 |
| EP | 1328104 | 7/2003 |
| EP | 2216722 | 8/2010 |
| GB | 2405052 | 2/2005 |
| JP | 2007-135035 | 5/2007 |
| KR | 10-2005-0077437 | 8/2005 |
| KR | 10-2005-0082834 | 8/2005 |
| WO | 0119081 | 3/2001 |
| WO | 03032584 | 4/2003 |
| WO | 2005071553 | 8/2005 |
| WO | 2010102055 | 9/2010 |
| WO | 2010137572 | 12/2010 |

OTHER PUBLICATIONS

Sousek, et al., "PCI Express Core Integration with the OCP Bus," CAST, Inc. 2006, 15 pages.

Mentor Graphics, "PCI Express to AMBA 3 AXI Bridge IP," Mentor Graphics, Jun. 2007, 2 pages.

Everton Carara, et al., "Communication Models in Networks-on-Chip," 18th IEEE/IFIP International Workshop on Rapid System Prototyping (RSP '07), 2007, pp. 57-60.

PCI-SIG, "PCI Local Bus Specification, Revision 3.0," Feb. 3, 2004, 3 pages.

* cited by examiner

METHOD, APPARATUS AND SYSTEM FOR HIERARCHICAL NETWORK ON CHIP ROUTING

TECHNICAL FIELD

Embodiments relate to network communications and more particularly to network communications in an integrated circuit.

BACKGROUND

Mainstream processor chips, both in high performance and low power segments, are increasingly integrating additional functionality such as graphics, display engines, security engines, and so forth. Such designs are highly segmented due to varying requirements from the server, desktop, mobile, embedded, ultra-mobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. This is so, as a given IP block typically needs to be re-designed to accommodate interface and signaling requirements of a given SoC.

To enable routing packets through a system, typically a header is provided with the packet that includes information to aid in routing and decoding the packet. However, these header formats are typically fixed and prevent flexibility to provide additional information by way of the header. As products have scaled in size/number of cores and on-die IP integration has increased, integration pressure occurs in part due to a destination identifier of the header. Simply increasing the width of the destination identifier has a massive negative impact on backwards compatibility with existing IP blocks built to an existing header protocol. Thus, a challenge with changing a header structure is largely one of maximizing both backwards compatibility and forwards scaling.

DETAILED DESCRIPTION

Figure 1:
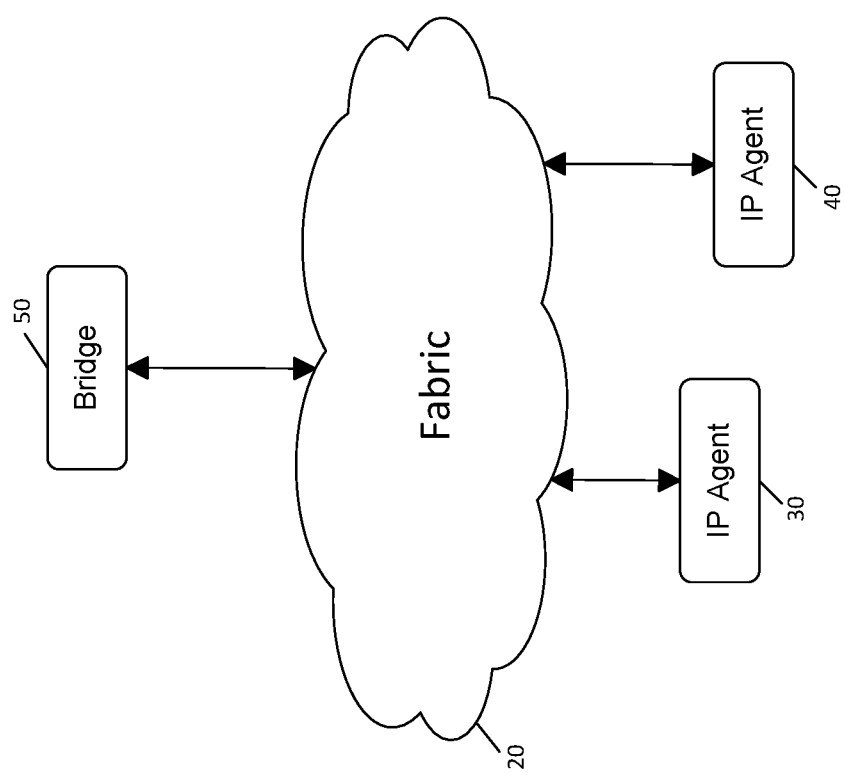
FIG. 1 is a block diagram of a basic interconnect architecture in accordance with an embodiment of the present invention.

In various embodiments, a hierarchical network architecture of an integrated circuit such as a SoC is provided. As one example, two hierarchies may be present in a network architecture: local networks (i.e., subnets) and a global network that couples to the local networks. In this arrangement, endpoints present in the global network (referred to as global endpoints) add a hierarchical routing header, e.g., at the beginning of all messages. Inbound/outbound to/from a subnet, this routing header is removed/added.

Embodiments may be used in a variety of communication architectures. One embodiment can be used in a sideband communication fabric for a source-routed NoC. In a message format, the first bits of a message constitute a destination identifier, "DestID," to indicate to the fabric exactly where to send the message. In a particular communication fabric, this DestID field may be defined to be 8 bits wide, thus limiting the network to 254 possible destinations (after 2 reserved encodings are consumed).

A physical port of a component such as an IP block is associated with one or more port identifiers, "PortIDs," to identify the port As such, DestID fields and source identifier, "SourceID," fields of headers provide an indication of a physical port of destination and source, respectively. In an embodiment, a PortID space is expanded by adding additional PortID routing information in the hierarchical routing header that is prepended on messages sent by an endpoint in the global domain. This information is used to route packets throughout a NoC or network circuitry of a SoC.

A transparent bridge connects the global and local domains and allows the global endpoints full visibility to everything behind the bridge. The transparent bridge allows PortIDs behind it to be reused. These PortIDs may have a fixed width according to a previous version of a specification. The transparent bridge enables them to be used in an updated system arrangement without to change the existing PortIDs. These PortIDs that are potentially reused across multiple local domains are also referred to as local PortIDs because agents having such identifiers only have the ability to address other endpoints in its local network and any of the global endpoints in a global domain. Similarly, the collection of routers and endpoints behind a transparent bridge is also referred to as a local network. In contrast, the global endpoints have full global visibility. Embodiments may leverage this scheme as it is assumed that only a few components need global knowledge (e.g., power management (PM), design for X (DFX), fuse, CPU register agents), among others. These components thus may be allocated within a global domain. In embodiments, good design techniques allocate only a limited number of components within a global domain, and further allocate locally communicating components within a common local network. For example, a first set of components associated with a first IP block may be present in a first local network including the first IP block. And similarly, a second set of components associated with a second IP block may be present in a second local network including the second IP block. For example, an IP block may be a PCIe controller, and local endpoints with this controller may include building blocks of the PCIe layer structure, a slice of a coherent fabric, and so forth. In particular embodiments, a local network may include a high speed controller (PCIe/USB) and its PHY and another local network may include all endpoints associated with a coherent fabric (which itself includes multiple building blocks).

Finally, PortIDs behind transparent bridges that are globally unique PortIDs are also referred to as semi-global PortIDs and the endpoints that own them as semi-global endpoints. Because of their unique PortIDs, semi-global endpoints can communicate with other semi-global endpoints and all global endpoints, but only with the local endpoints that are behind the same transparent bridge.

Messages sent by global endpoints always contain the hierarchical routing header. If a global message targets another global endpoint, the endpoint receives it unmodified and is configured to decode both sets of included routing information, even if it has no functional use for it. If a message targets a local endpoint, the message travels through a transparent bridge connecting the global domain to the local domain, and the transparent bridge strips off the hierarchical routing header such that the message appears in a message format expected by the local endpoint. Messages sent by local endpoints contain a single header with one set of routing information.

In an embodiment with an 8-bit legacy identifier field width, global endpoints are allocated a PortID value above a given 8-bit number, N. Routers within a local network are configured such that they route PortIDs above N towards the local network's transparent bridge. Consequently, global endpoints always appear above a fixed value from the perspective of a local network's PortID map. Among other things, this allows endpoints in a local network to address global endpoints using an 8-bit PortID, and global endpoints alias into all local networks.

Broadcast and multicast messages are handled hierarchically in a network that is hierarchically routing aware. When initiated in the global network, the DestID in the hierarchical routing header of a multicast or broadcast message determines the set of global endpoints and transparent bridges that are targeted. Any such messages that target transparent bridges have their hierarchical routing header removed, and the local network will act upon the revealed header. The revealed header may further indicate a broadcast, multicast, or unicast-PortID, thus allowing the message to target any subset of a local network.

Understand that even with this arrangement, routing is still done 8 bits at a time. The PortID space is split so local endpoints can address all global endpoints. Global DestIDs alias into each subnet such that a local endpoint still can determine the entity that is sending it a message. Similarly, local endpoints have a hierarchical header appended to their packets by the transparent bridge, thus allowing the global endpoint to identify from which subnet and local endpoint a message originates, as described below.

In summary, instead of continuing with a flat 8-bit DestID space or growing to a flat 16-bit DestID space, embodiments provide a hierarchical 16-bit DestID space. While the specific example here is extension from 8 bits to 16 bits, embodiments are not so limited and can be used to increase address space from any M to N bits. The total number of PortIDs in this scheme grows with the number of subnets. If the global network supports N subnets, then each subnet will also have size N, and thus $N^2$ destination IDs may be supported.

Embodiments can be used in many different types of systems. As examples, implementations described herein may be used in connection with semiconductor devices such as processors or other semiconductor devices that can be fabricated on a single semiconductor die. In particular implementations, the device may be a system-on-chip (SoC) or other advanced processor or chipset that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
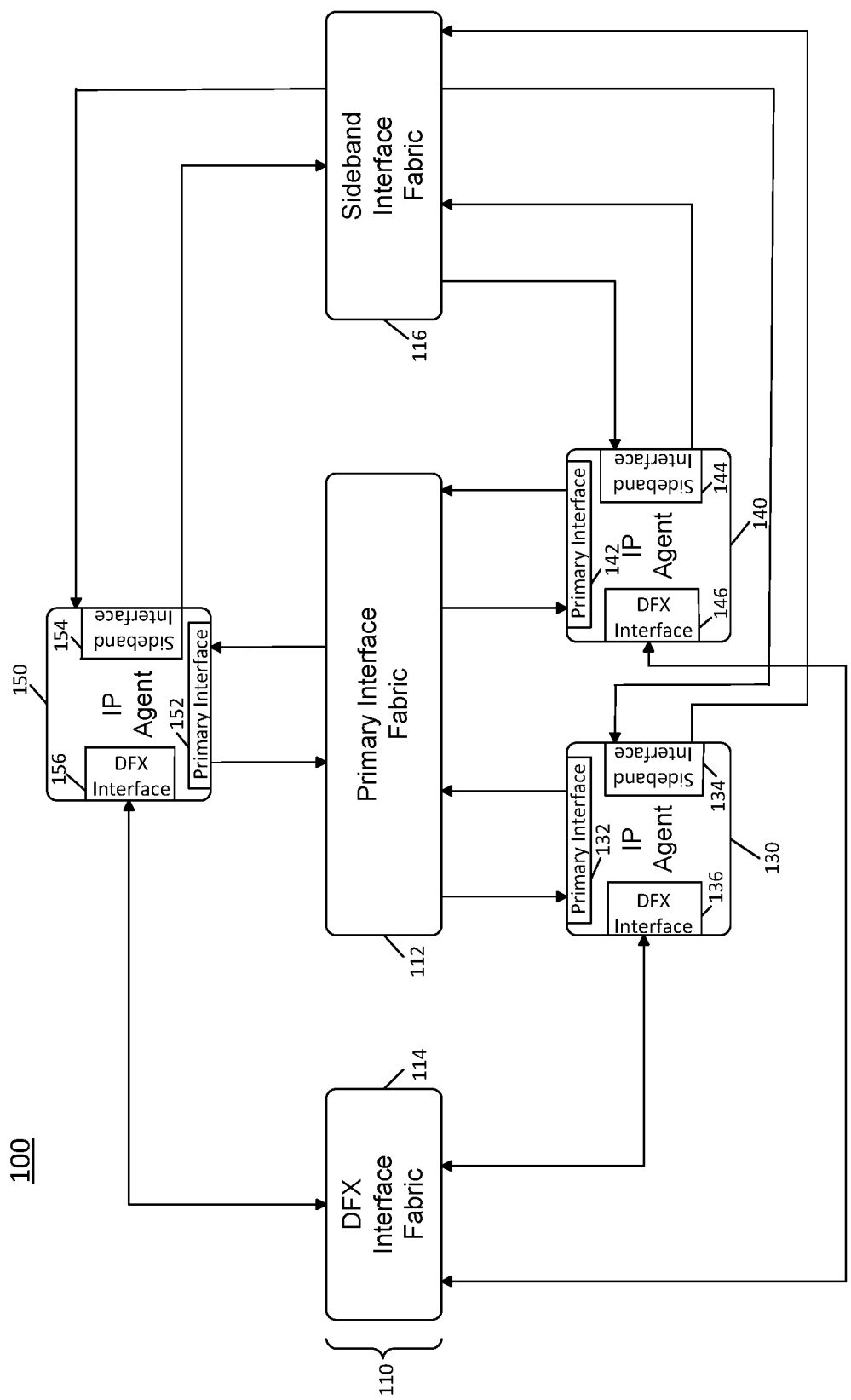
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
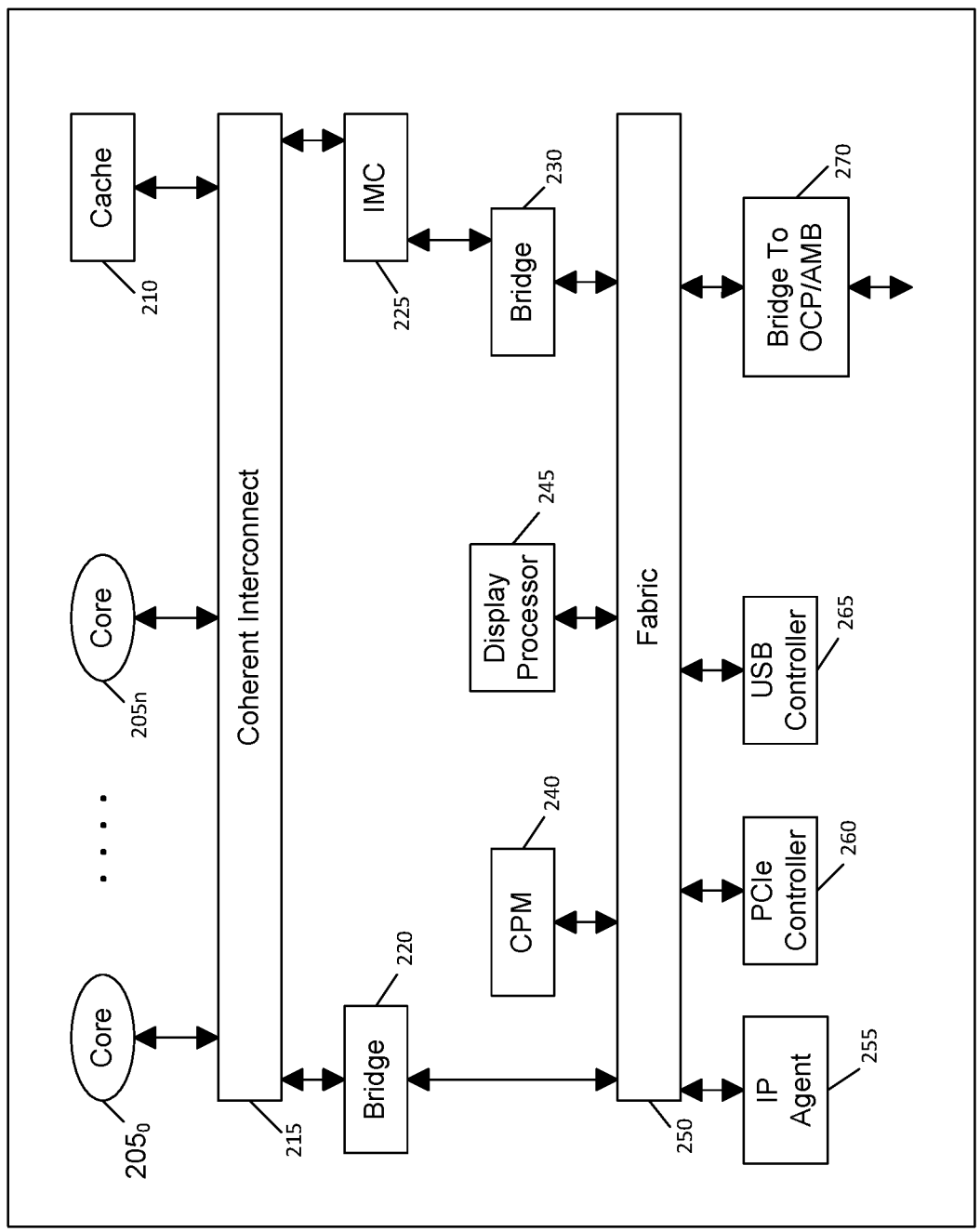
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
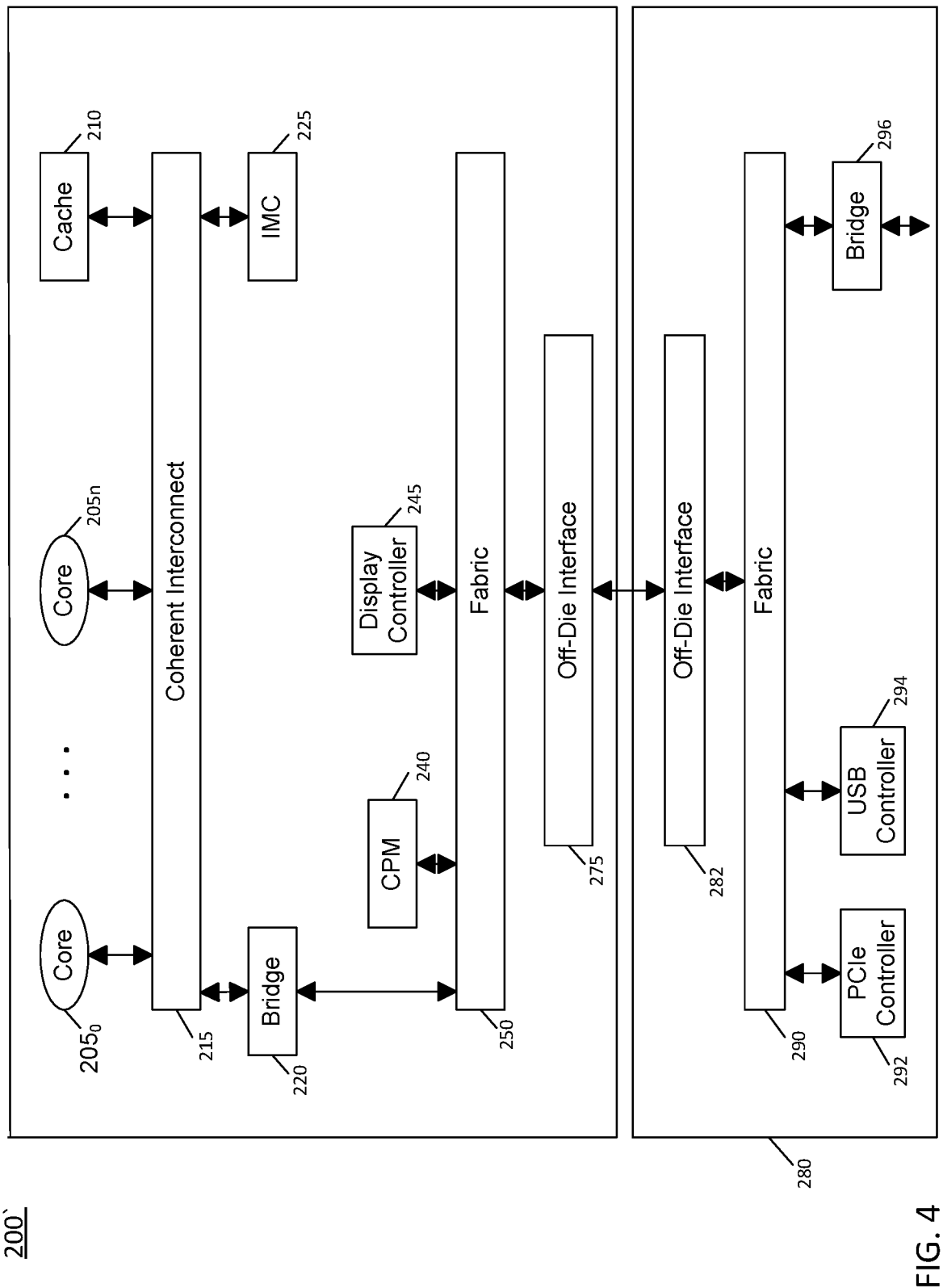
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

Figure 5:
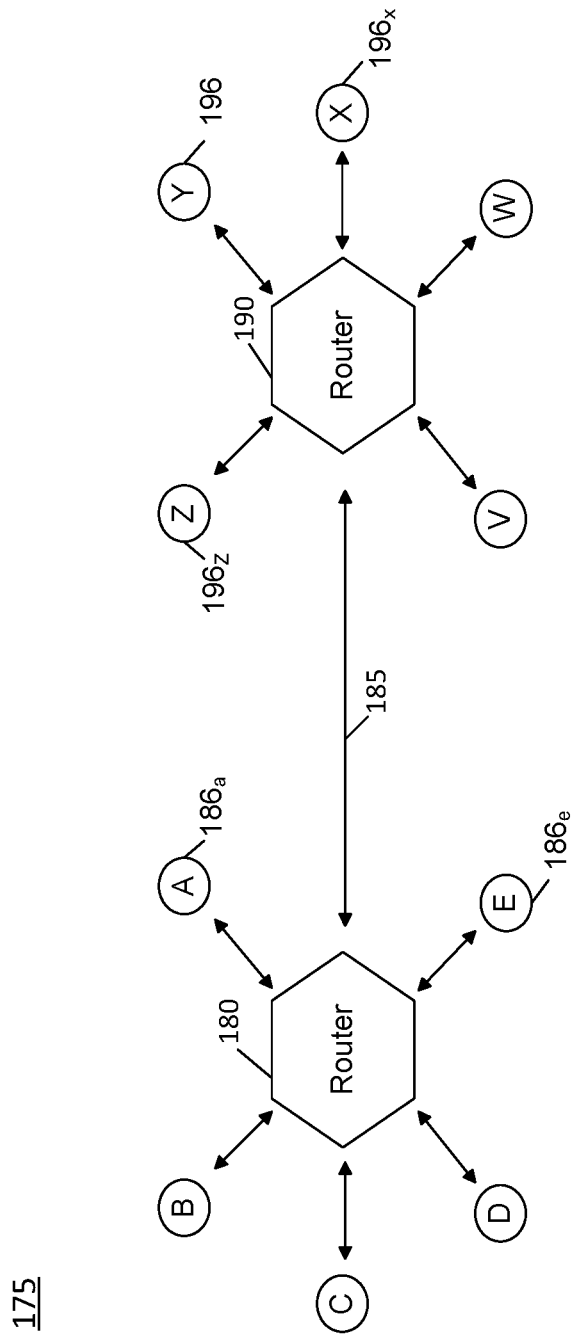
FIG. 5 is a block diagram of a sideband interconnection in accordance with an embodiment of the present invention.

As discussed above, in various embodiments all out-of-band communications may be via a sideband message interface. Referring now to FIG. 5, shown is a block diagram of a sideband interconnection in accordance with an embodiment of the present invention. As shown in FIG. 5, sideband interface system 175 includes multiple routers 180 and 190, which are shown in the embodiment of FIG. 5 as being coupled via a point-to-point (PTP) interconnect 185. In turn, each router can be coupled to various endpoints, which can be, for example, IP agents or other components of a given system. Specifically, router 180 couples to a plurality of endpoints 186a-186e and router 190 couples to a plurality of endpoints 196x-196z.

Figure 6:
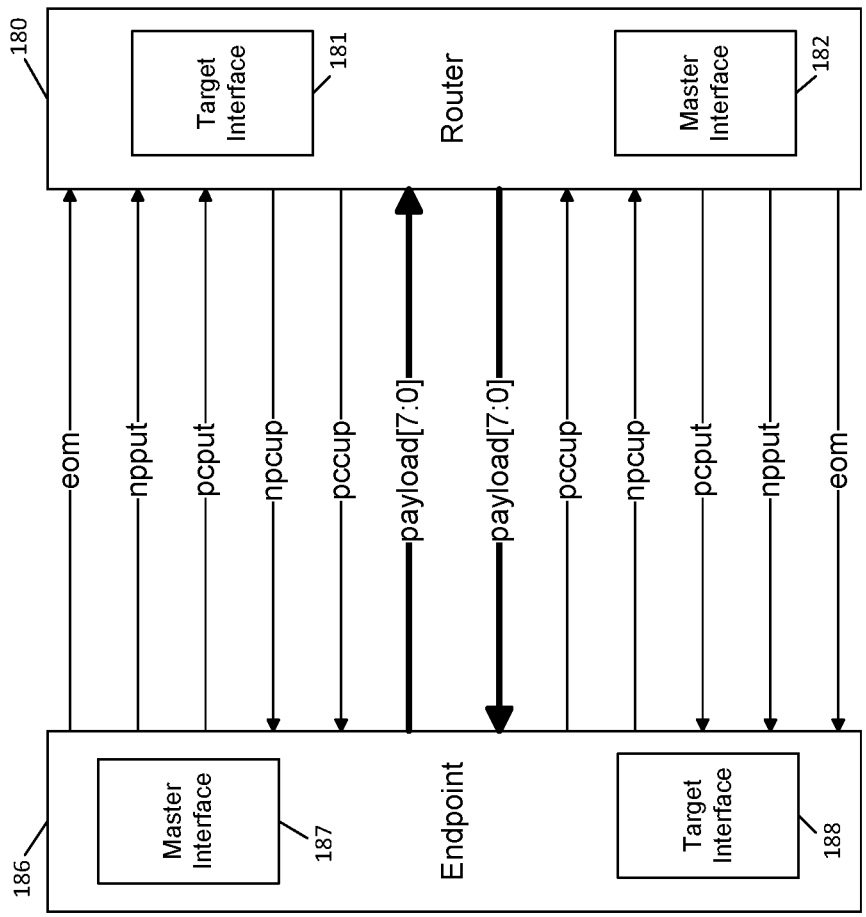
FIG. 6 is a block diagram of details of signaling available for a sideband interface in accordance with an embodiment of the present invention.

Referring now to FIG. 6, shown is a block diagram of details of signaling available for a sideband interface in accordance with an embodiment of the present invention. As shown in FIG. 6, interconnection between a router 180 and an endpoint 186 is shown. As seen, router 180 may include a target interface 181 and a master interface 182. In general, target interface 181 may be configured to receive incoming signals, while master interface 182 may be configured to transmit outgoing signals. As seen, endpoint 186 also includes a master interface 187 and a target interface 188.

FIG. 6 further shows details of the various signaling available for the sideband interface, including credit information, put information, end of message signaling, and data. Specifically, credit updates can be communicated via sideband interfaces as a non-posted credit update signal (NPCUP) and a posted credit update signal (PCCUP). In addition, put signals may be provided (NPPUT and PCPUT). In addition, an end of message (EOM) signal can be communicated. Finally, data may be communicated via payload packets which in one embodiment can be implemented via a byte-wide communication channel. Although shown with this particular implementation in the embodiment of FIG. 6, the scope of the present invention is not limited in this regard. Whenever a credit Put signal is high, this means that a credit is being returned. Whenever a put signal is high, it means that the payload (e.g., data) signal is valid. Whenever a Put and EOM are high at the same time, it means that the current payload is the last payload of the message. Note that the interface can both "put" a data payload and "put" a credit in the same clock cycle.

Figure 7:
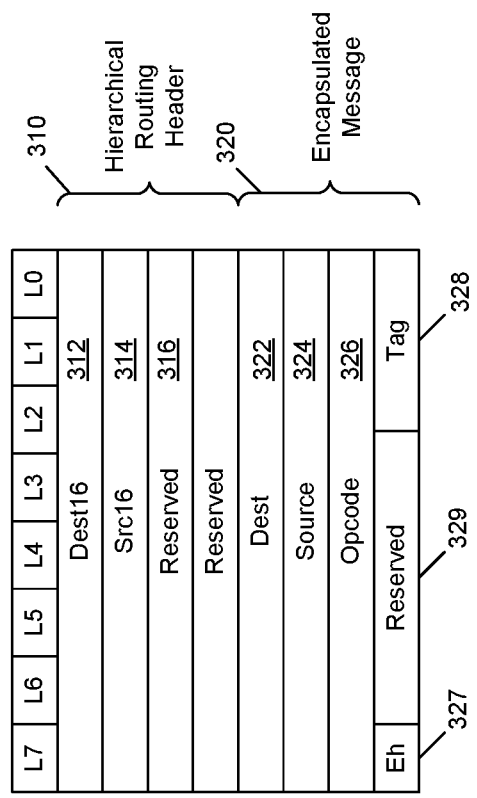
FIG. 7 is a block diagram of a packet format to enable hierarchical network on chip routing as described herein.

Referring now to FIG. 7, shown is a block diagram of a packet format to enable hierarchical network-on-chip routing as described herein. As illustrated, a message 300, which may be in the form of a packet, is provided to enable communication through multiple levels of a hierarchical NoC. More specifically as shown, message 300 includes a hierarchical routing header 310 and an encapsulated message header 320. In the embodiment shown, hierarchical routing header 310 includes a destination identifier field 312, a source identifier field 314 and a reserved field 316. In turn, encapsulated message 320, which is a base message according to a legacy fabric communication protocol such as an Intel® IOSF protocol, includes a destination field 322, a source field 324, an opcode field 326, an expanded header indicator 327, a tag field 328, and a reserved portion 329. Understand although shown with this limited information, a given packet may further include data or other payload information, e.g., in the case of a data return message.

In embodiments described herein, a 16-bit global endpoint or port identifier, which may be twice the width of a legacy identifier for the given communication protocol, can be formed of the information present in hierarchical routing header 310 and encapsulated message 320. More specifically, to enable a 16-bit destination identifier, the information in destination field 312 may be combined with the information in destination field 322 to thus form a 16-bit destination identifier. In an embodiment, the information in destination field 312 may provide the most significant bits (MSBs) of the resulting 16-bit destination identifier and in turn, the information in destination field 322 may provide the least significant bits (LSBs) of the 16-bit destination identifier. Similarly, the information in source field 314 may be combined with the information in source field 324 to form a 16-bit source identifier. Note of course that encapsulated message 320 may further include additional information, such as a payload to be communicated, e.g., data or so forth.

Figure 8:
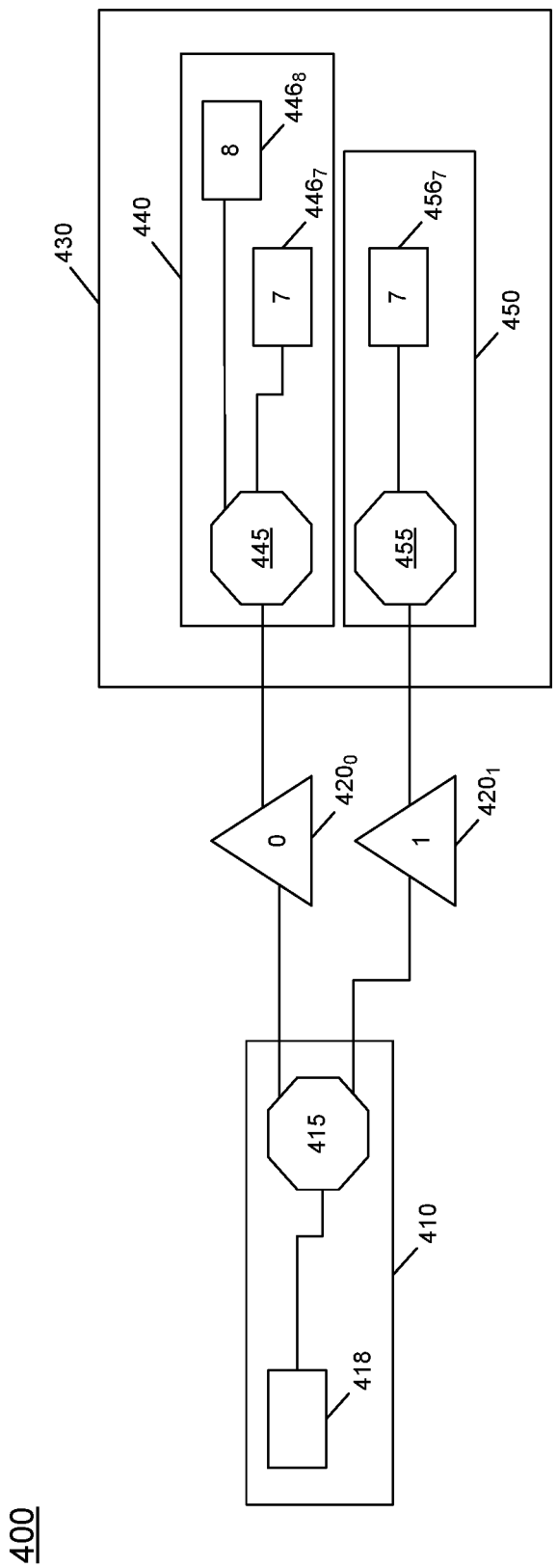
FIG. 8 is a high level block diagram of a hierarchical network in accordance with an embodiment of the present invention.

Referring now to FIG. 8, shown is a high level block diagram of a hierarchical network in accordance with an embodiment of the present invention. As shown in FIG. 8, network 400 may be implemented as part of a single die SoC. In some embodiments, the hierarchical network may span multiple sub-dies of an SoC. In this case, the global network spans across the individual dies and provides access to sub-networks (plural) of each individual die. In the embodiment shown, NoC 400 includes a global network 410 and a local network domain 430 including local networks 440 and 450. To provide interconnection between global network 410 and individual local networks within local network domain 430, a plurality of transparent bridges $420_0$-$420_1$ are provided. Note that while only two such transparent bridges are shown for ease of illustration in FIG.

8, understand that in different embodiments many more transparent bridges may be present.

A single global endpoint 418 is illustrated in global network 410. Global endpoint 418 may be any type of IP agent that is able to communicate with all endpoints within NoC 400. As one such example, global endpoint 418 may be a power management agent. Understand that while a single global endpoint is shown for ease of illustration, a global network can include many more global endpoints. As seen, global endpoint 418 couples to a router 415, which is implemented as a global router. As such, global router 415 is configured to handle global addressing (for example, 16-bit addressing) as described herein, although it only may perform routing based on information in the hierarchical header and more specifically the first byte, in an embodiment. In this way, router 415 can communicate incoming packets received from a transparent bridge 420 to a given destination global endpoint (or to another transparent bridge). And further, router 415 can direct packets received from a given global endpoint (or a transparent bridge) to an intended destination, whether within global network 410 or in one or more local networks within local network domain 430, by way of one or more of transparent bridges 420. Note that global network 410 may include more than one router.

As illustrated, local network domain 430 may include one or more local networks. In the embodiment shown, local networks 440 and 450 are present. Each local network may include a local router (445/455) that interfaces between a transparent bridge 420 associated with the local network and a plurality of local endpoints within the given local network. More specifically, local network 440 includes local endpoints $446_7$ and $446_8$ coupled to router 445. In turn, local network 450 includes a local endpoint $456_7$ coupled to router 455. Understand while shown with limited numbers of local endpoints for ease of illustration, each local network may include up to N local endpoints. Furthermore, understand that port identifiers for local endpoints within a local network are unique within the local network, but they are not globally unique. For example, as illustrated in FIG. 8, local endpoints $446_7$ and $556_7$ both may be configured with the same port identifier, namely port identifier 7.

Figure 9:
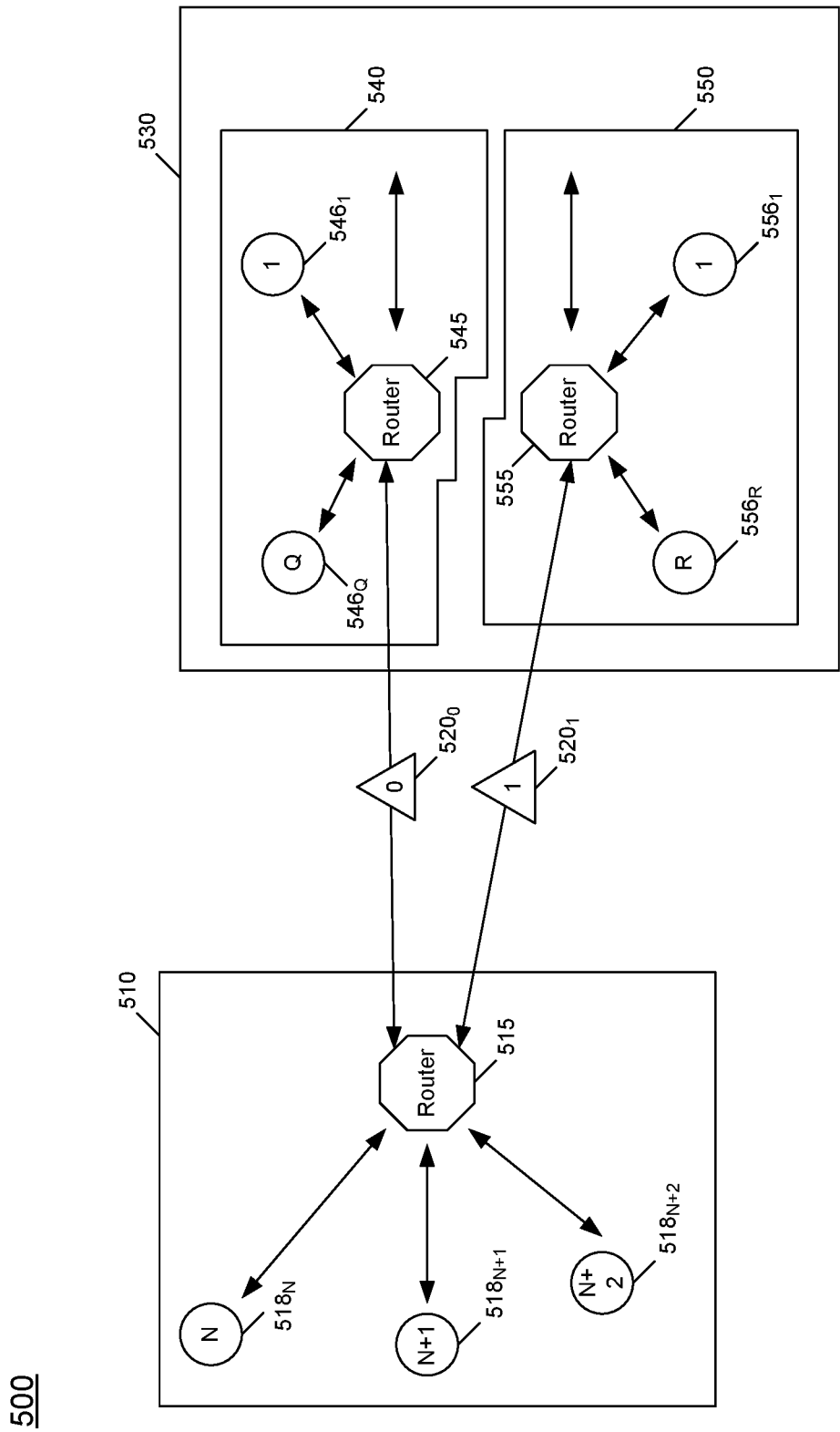
FIG. 9 is a block diagram of a hierarchical network in accordance with another embodiment of the present invention.

Referring now to FIG. 9, shown is a block diagram of a hierarchical network in accordance with another embodiment of the present invention. In the embodiment shown in FIG. 9, NoC 500 may be formed as a hierarchical sideband network to enable sideband communication between various agents/endpoints within an SoC or other processor device. As illustrated in FIG. 9, a global network 510 couples to a local network domain 530 via multiple sideband transparent bridges $520_0$-$520_1$. In turn, local network domain 530 includes a plurality of local networks, including local network 540 and local network 550.

In the embodiment shown, global network 510 is implemented as a domain and includes a global router 515 and a plurality of global endpoints $518_N$-$518_{N+2}$. Note that in an embodiment, N is an arbitrary 8-bit number such that all endpoints within global network 510 have a port identifier greater than N. This arbitrary number N is a predetermined number, e.g., set during design of the SoC as a configuration value such that all global endpoints are configured with a unique 16-bit port identifier formed of two 8-bit portions that, in an embodiment, both equal a value of at least N. In turn, local networks within local network domain 530 may be implemented as 8-bit domains. And, all local endpoints are configured with unique or non-unique PortIDs having an 8-bit value less than N.

In embodiments, local networks may include a mix of local endpoints and semi-global endpoints. In the illustration shown, local network 540 includes a local endpoint $546_1$ and a semi-global endpoint $546_Q$. In turn, local network 550 includes a local endpoint $556_1$ and a semi-global endpoint $556_Q$. Note that endpoints $546_1$ and $556_1$ are local, as their port identifiers are not globally unique. In contrast, endpoints $546_Q$ and $556_R$ are semi-global endpoints, in that their port identifiers are globally unique. Understand while shown at this high level in the embodiment of FIG. 9, many variations and alternatives are possible.

Figure 10:
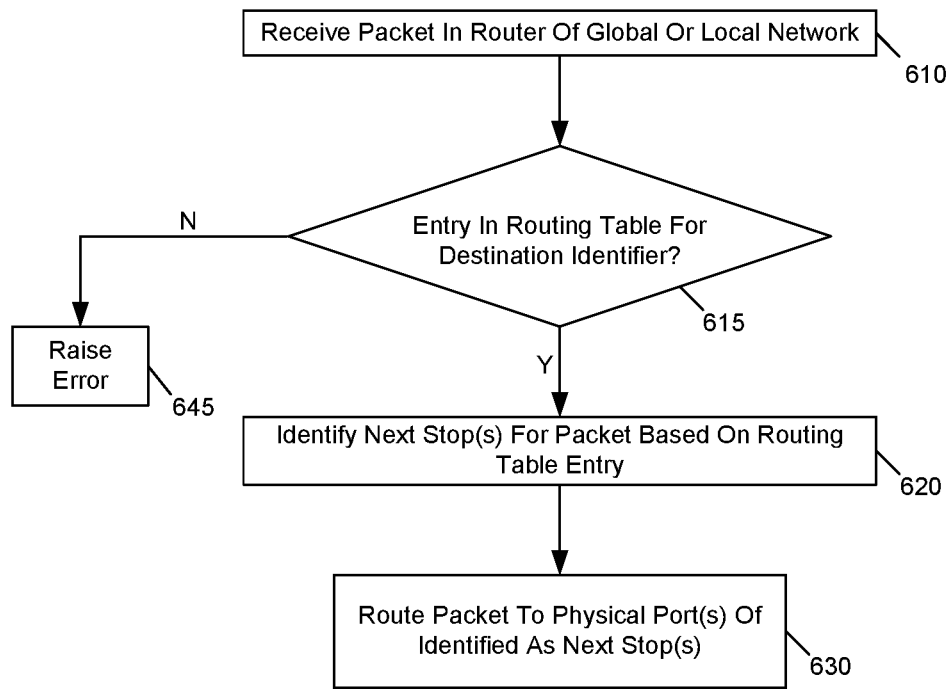
FIG. 10 is a flow diagram of a method for communicating within a SoC in accordance with an embodiment.

Referring now to FIG. 10, shown is a flow diagram of a method for communicating within a SoC in accordance with an embodiment. As shown in FIG. 10, method 600 may be performed within a router of a global network or local network. As seen, method 600 begins by receiving a packet in the router (block 610). Next control passes to diamond 615 where it is determined whether there is an entry in a routing table for the destination identifier of the packet. Note that in the case of a global network router, this incoming packet may include an appended hierarchical routing header having a first byte that includes an 8-bit destination identifier. And in the case of a local network router, a conventional packet without a hierarchical routing header includes as a first byte a byte-width destination identifier. Note that this router may include or be coupled to a routing table that stores a plurality of entries, each to associate a destination identifier with a corresponding physical port (or ports).

Note that this physical port is not necessarily the indication of a physical port for one or more final destinations of the message; instead in embodiments this physical port information in the routing table may be used to identify a next hop or stop on a route to the eventual destination. In other cases, a global destination identifier of a packet within the global network that results from appending two different portions of a destination identifier provided by way of a hierarchical routing header and a header of a standard message that in turn includes a destination identifier may be used for routing purposes within the global network.

If it is determined that no valid entry is present in the routing table for the destination identifier (namely that the destination identifier does not index into the routing table), control passes to block 645 where an error may be raised. For example, the router may communicate an error message back to the sender. Or in some embodiments according to a given policy, this message may be simply dropped. In a particular embodiment, a completion may be generated for a non-posted message and posted completion messages may be dropped.

Still with reference to FIG. 10, if a valid entry is found in the routing table for the global destination identifier, control passes to block 620 where the next stop for the packet can be determined based on this routing table entry. As discussed above, the entry may indicate one or more physical ports of an agent(s) that is a next stop for the packet on its route to a final destination. Next, control passes to block 630, where the packet is routed to one or more physical ports identified as the next stop.

Understand that in different cases, this physical port may be of an endpoint, router, transparent bridge or other component. If the port is of a transparent bridge, the transparent bridge after appropriate parsing including removal of the hierarchical routing header, forwards the message on to a local network router to which the transparent bridge is coupled. If the packet resolves to a physical port of a global endpoint of the global network, the router forwards the packet to the indicated global endpoint (or multiple global endpoints, in case of a multicast or broadcast message). Understand while shown at this high level in the embodiment of FIG. 10, many variations and alternatives are possible.

Figure 11:
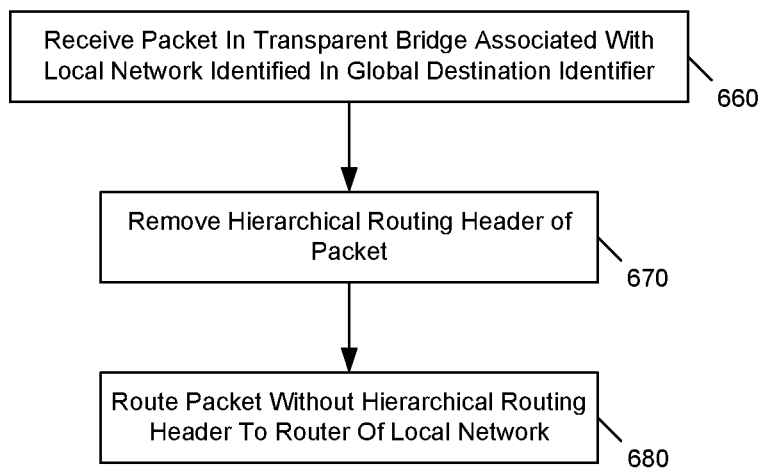
FIG. 11 is a flow diagram of a method in accordance with yet another embodiment of the present invention.

Referring now to FIG. 11, shown is a flow diagram of a method in accordance with another embodiment of the present invention. More specifically, method 650 shown in FIG. 11 may be performed within a transparent bridge to handle message processing operations as described herein. As seen, method 650 begins by receiving a packet in a transparent bridge associated with a local network that is identified in a global destination identifier of the packet (block 660). Continuing with the operation discussed as to FIG. 10, this packet may be received from a router of the global network. Control next passes to block 670 where the hierarchical routing header is removed from the packet. This is the case since this hierarchical routing header is not used in processing packets within the local network. As such, control passes to block 680 where the packet without the hierarchical routing header is routed to a given router of the local network. More specifically, this router is the router to which the transparent bridge is connected, so that the message may then be decoded by the router to be passed along to the intended destination. Understand while shown at this high level in the embodiment of FIG. 11, many variations and alternatives are possible.

Figure 12:
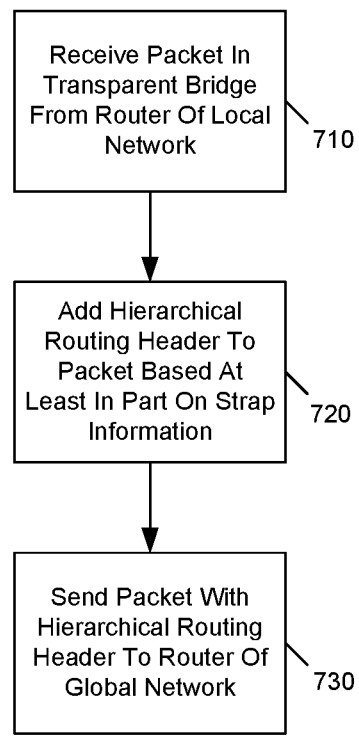
FIG. 12 is a flow diagram of a method in accordance with another embodiment of the present invention.

Referring now to FIG. 12, shown is a flow diagram of a method in accordance with yet another embodiment of the present invention. As shown in FIG. 12, method 700 may be performed by a transparent bridge for communicating a packet originating from a local network to a global network. More specifically, as shown in method 700 a packet is received in the transparent bridge from a router of a local network (block 710). Note that since this packet is received from a local network that does not use (or comprehend) hierarchical routing information, the packet is received with a standard header having, e.g., an 8-bit destination identifier in a destination field of the packet.

Control next passes to block 720, where the transparent bridge can add a hierarchical routing header to the packet. More specifically, the transparent bridge can add a hierarchical routing header that includes 8 bits of a destination identifier (which may be a copy of the destination identifier of the received packet) and an 8-bit source identifier, which may be generated based on strap information stored in the transparent bridge, e.g., in a configuration storage of the transparent bridge. Note that this strap information may be implemented as a set of pins, an RTL parameter (elab-time constant), configuration register, or any other mechanism that provides constant configuration inputs. Still further, the transparent bridge may apply a predetermined set of bits for the reserved fields of the hierarchical routing header (e.g., all zeros) to append this hierarchical routing header, e.g., to a front end of the packet. Thereafter, control passes to block 730 where the packet is sent with this added hierarchical routing header to a given router of the global network to which the transparent bridge is coupled, to enable this packet with the hierarchical routing header to be sent to the appropriate global endpoint or other destination. Understand while shown at this high level in the embodiment of FIG. 12, many variations and alternatives are possible.

Figure 13:
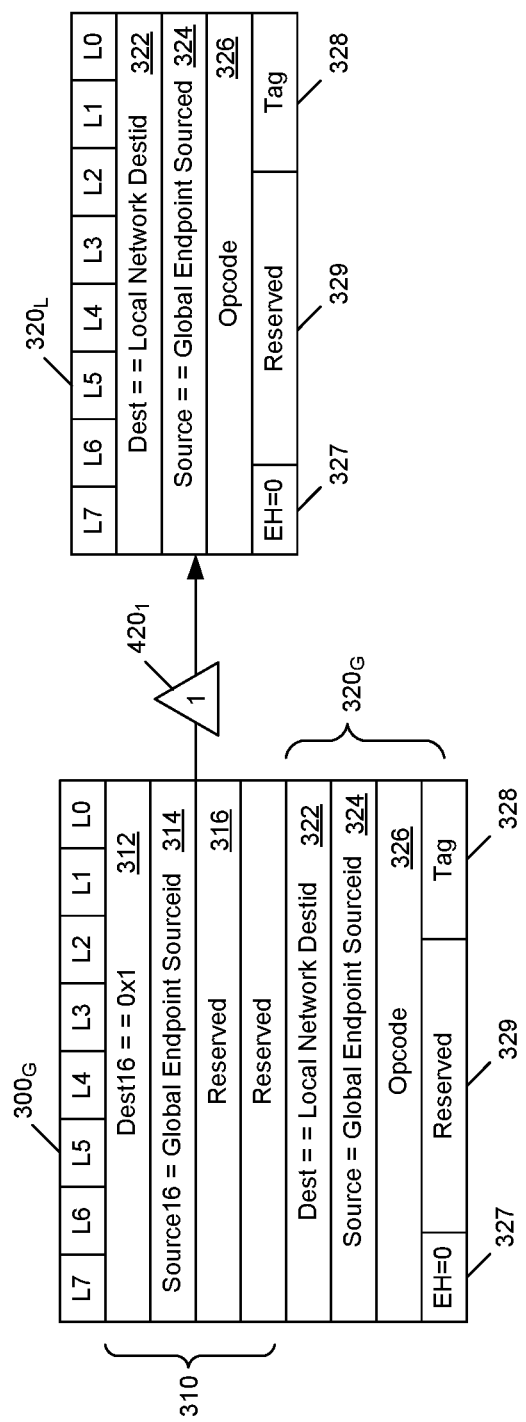
FIG. 13 is a block diagram illustrating example operation of a transparent bridge for handling global network-to-local network communication in accordance with an embodiment.

Referring now to FIG. 13, shown is a block diagram illustrating example operation of a transparent bridge for handling a global network-to-local network communication in accordance with an embodiment. Assume transparent bridge 420$_1$ is coupled between a global network element (not shown in FIG. 13) and a local network element (not shown in FIG. 13). As examples, transparent bridge 420$_1$ may be coupled directly between a global router of a global network and a local router of a local network. Note that in some cases, transparent bridge 420$_1$ may be implemented in a port of one or more of the global network and/or local network elements, such as within a port of one or more of the global router and the local router instead of being a separate component such as a control circuit or logic.

In the embodiment shown in FIG. 13, transparent bridge 420$_1$ receives an incoming global packet 300$_G$. As this packet is received from the global domain, packet 300$_G$ includes a hierarchical routing header 310 and a corresponding encapsulated packet 320$_G$. As seen, hierarchical routing header 310 includes the same fields as discussed above with regard to FIG. 7 and similarly, encapsulated message 320$_G$ includes the same fields as shown in encapsulated packet 320 of FIG. 7. Note that the combination of source fields 314 and 324 thus provide a port identifier for the global endpoint source of packet 300$_G$. And similarly, the combination of destination fields 312 and 322 provide a destination identifier for a local endpoint in the local network (via the bits of destination field 322). And in the global router, the destination information of field 312 can be used to direct packet 300$_G$ to transparent bridge 420$_1$. Note further as to packet 300$_G$, the high order bits of a global destination identifier of a global destination identifier field 312 are set at a value of 0x1H. In this example, transparent bridge 420$_1$ may be configured, e.g., by strap information, to have this port identifier of 0x1H. This port identifier is thus used by the global router to route packet 300$_G$ to transparent bridge 420$_1$.

Transparent bridge 420$_1$ operates to remove prepended hierarchical routing header 310 from packet 300$_G$ to thus output message 320$_L$, which is encapsulated message 320$_G$. Accordingly, transparent bridge 420$_1$ routes message 320$_L$ to the local router. In turn, the local router may parse this header information to send the message to the given local endpoint identified in destination field 322. Understand while not shown for ease of illustration in FIG. 13, in some cases message 320$_L$ may include additional payload information, e.g., in cases of a data completion message.

Figure 14:
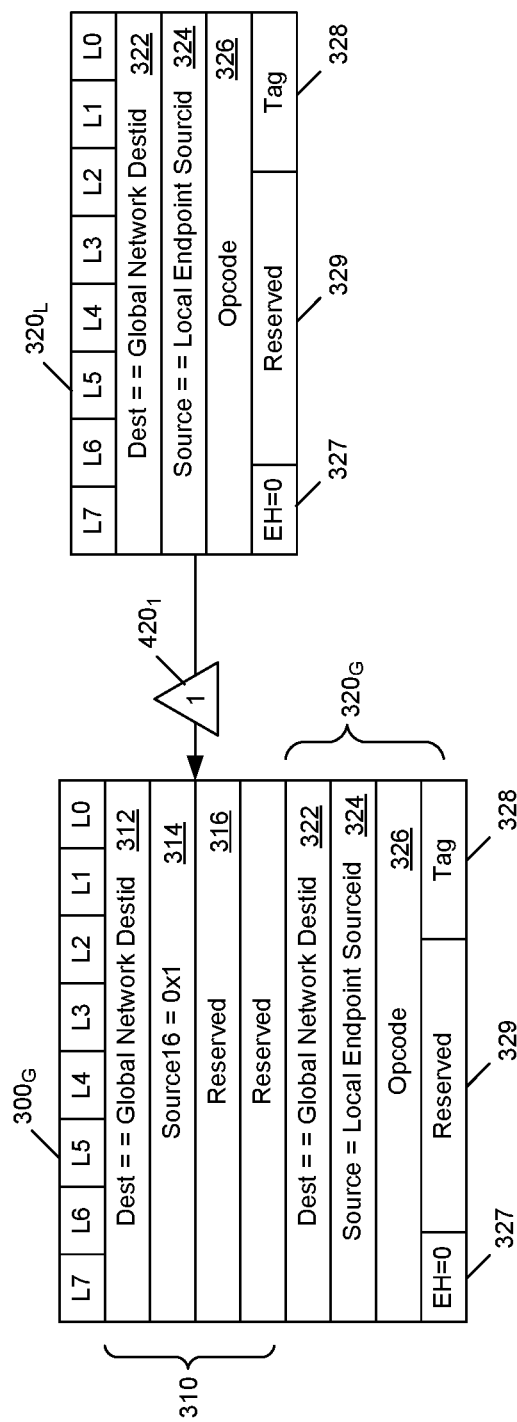
FIG. 14 is a block diagram illustrating example operation of a transparent bridge for handling local network-to-global network communication in accordance with an embodiment.

FIG. 14 shows the functionality of transparent bridge 420$_1$ when a message passes from its local side to its global side. In this scenario, the local endpoint was addressing a global endpoint and the local network router is configured to route message 320$_L$ toward transparent bridge 420$_1$. Transparent bridge 420$_1$ receives this message and passes the original message 320$_L$ unmodified as message portion 320$_G$ of global message 300$_G$. As seen, transparent bridge 420$_1$ sends the original DestID of destination field 322 straight through unmodified and replicates it in destination field 312 and appends its strapped SourceID (0x1 in the example) as source field 314, and adds two reserved bytes as reserved field 316 before forwarding the message with the original message 320$_L$ unchanged including the original DestID field.

Embodiments may be used in a source-routed NoC, to enable a fixed width destination ID field to be increased without affecting legacy operation. As such, embodiments enable a sideband fabric to scale past an existing boundary of 254 endpoints. In this way, a sideband fabric can scale from the biggest server chip down to the smaller device chip.

Figure 15:
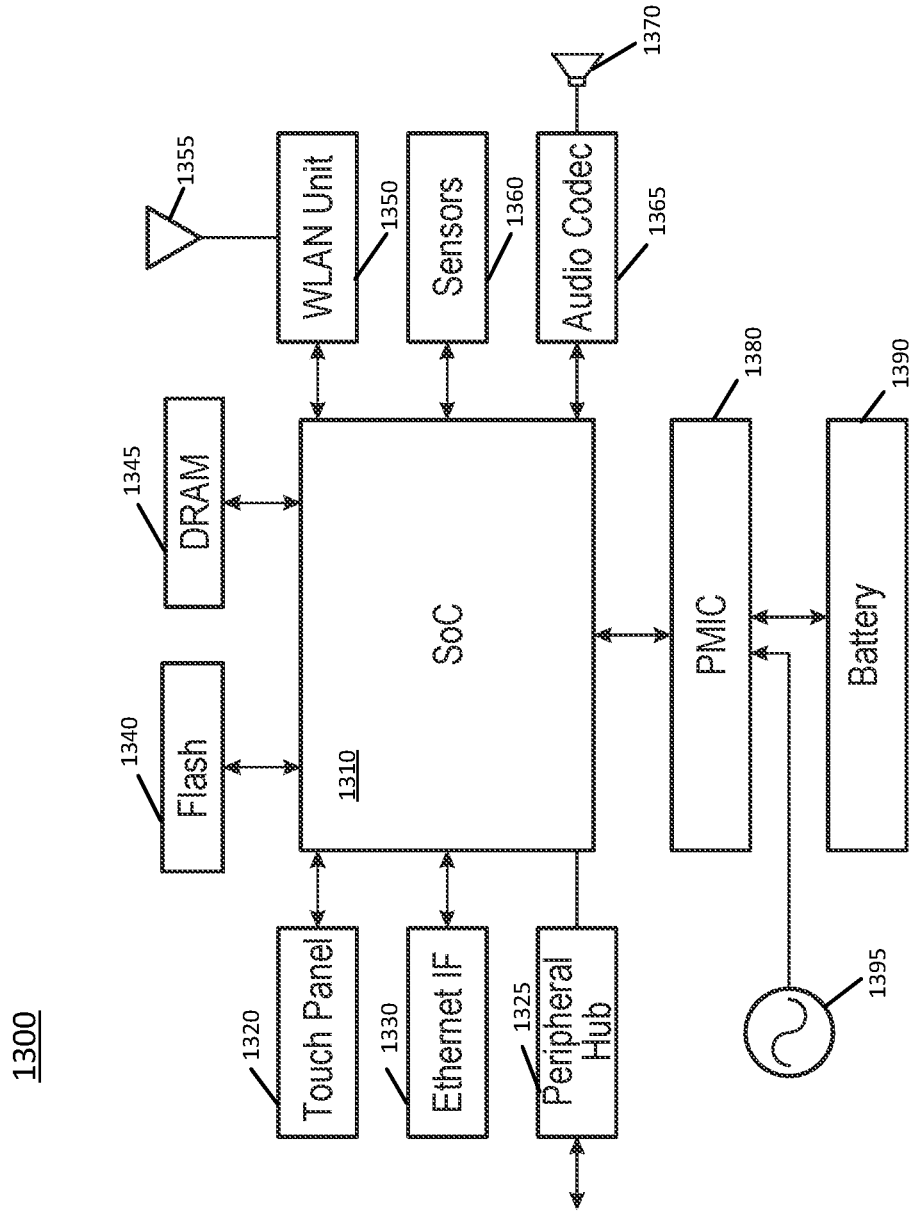
FIG. 15 is a block diagram of an example system with which embodiments may be used.

Referring now to FIG. 15, shown is a block diagram of an example system with which embodiments may be used. In the illustration of FIG. 15, system 1300 may be a mobile low-power system such as a tablet computer, 2:1 tablet, phablet or other convertible or standalone tablet system. As illustrated, a SoC 1310 is present and may be configured to operate as an application processor for the device. SoC 1310 may include an NoC to implement hierarchical routing of at least a sideband fabric as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 15, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 15, many variations and alternatives are possible.

Figure 16:
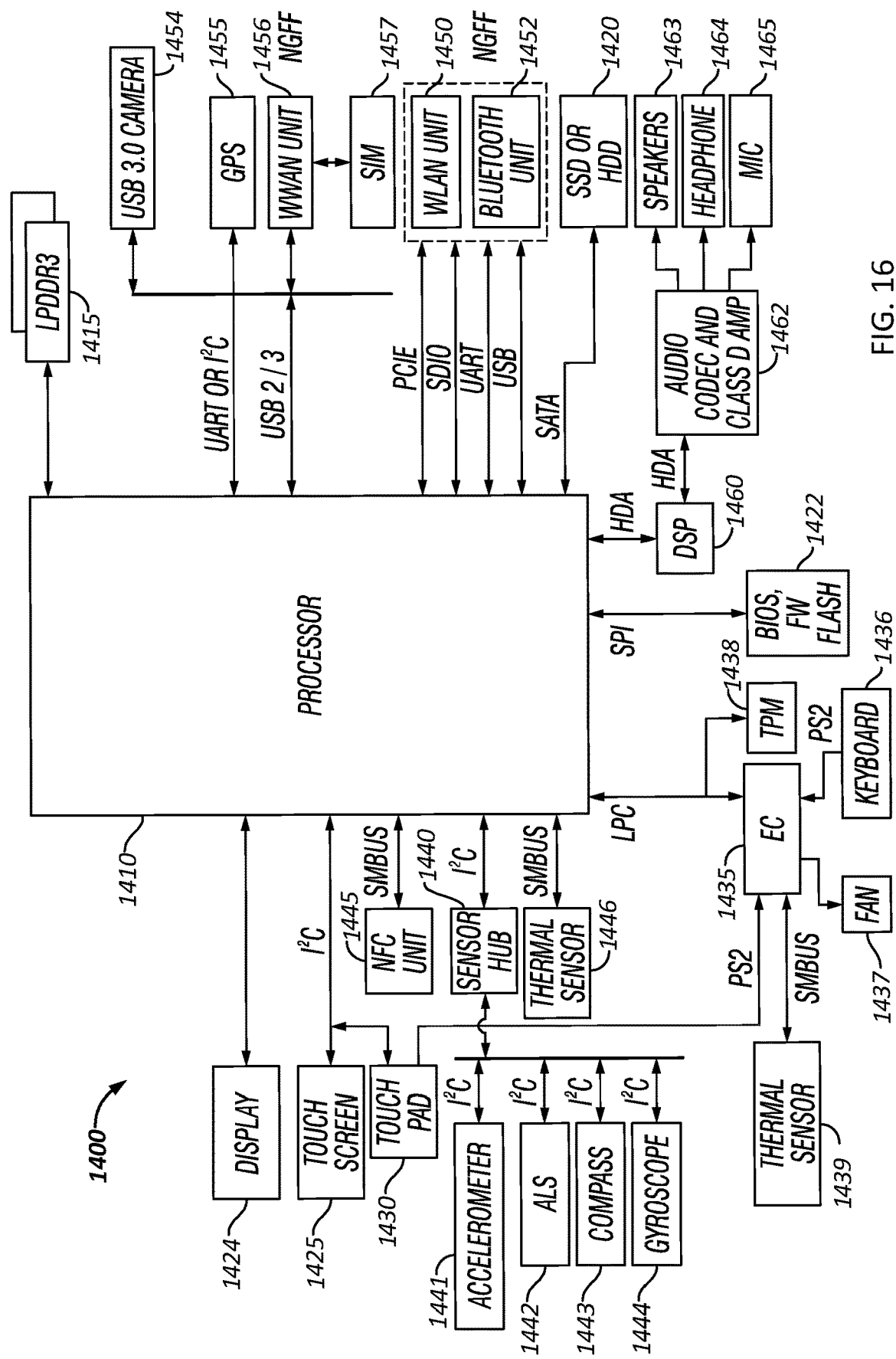
FIG. 16 is a block diagram of a representative computer system.

Referring now to FIG. 16, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400, and may include power management circuitry as described herein. As one example, processor 1410 is implemented as a SoC, and may include NoC that performs hierarchical routing as described herein. Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 16, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 16 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 16, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 16, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 16, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 16, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 16, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 16, understand the scope of the present invention is not limited in this regard.

Figure 17:
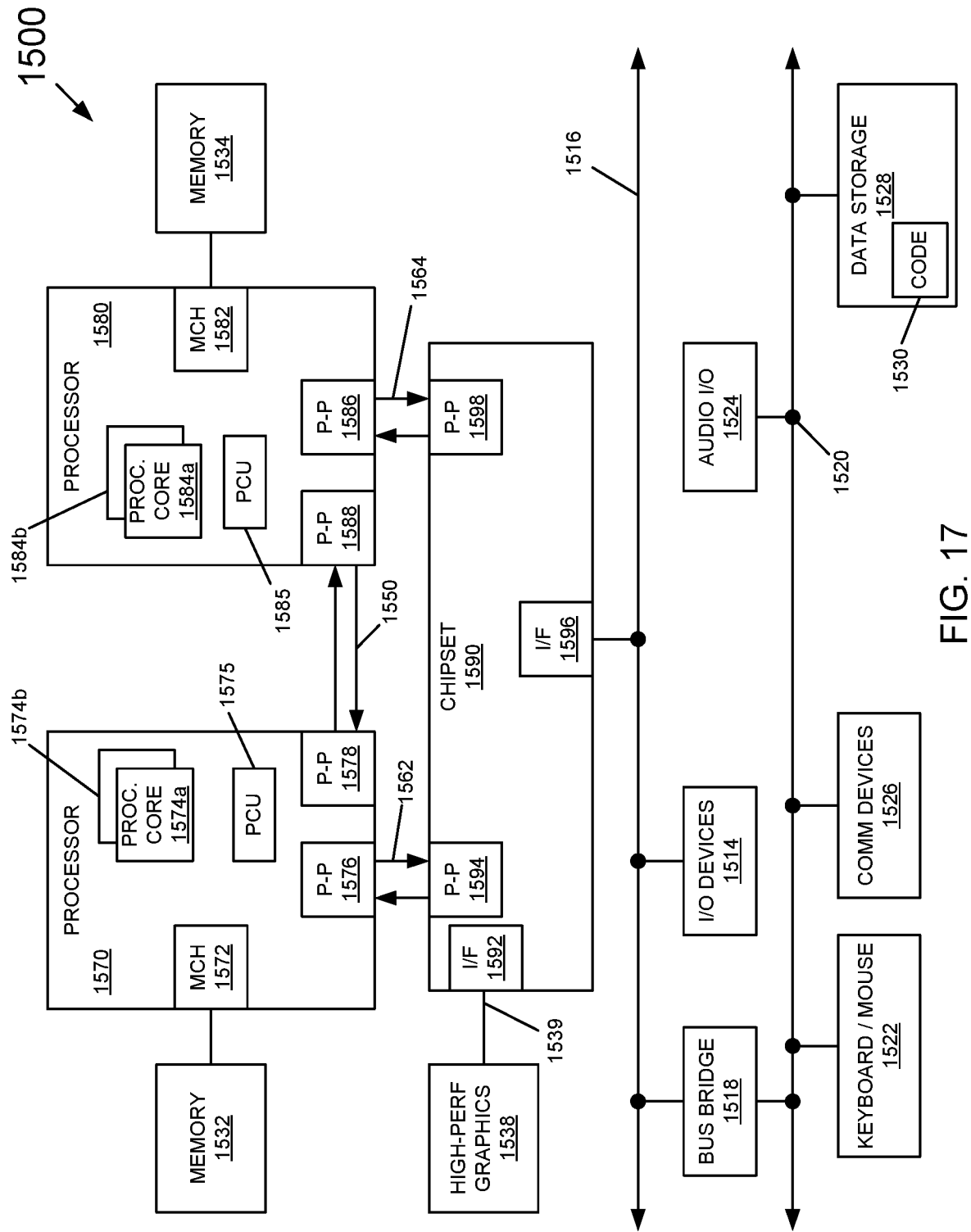
FIG. 17 is a block diagram of a system in accordance with an embodiment of the present invention.

Embodiments may be implemented in many different system types. Referring now to FIG. 17, shown is a block diagram of a system in accordance with an embodiment of the present invention. As shown in FIG. 17, multiprocessor system 1500 is a point-to-point interconnect system, and includes a first processor 1570 and a second processor 1580 coupled via a point-to-point interconnect 1550. As shown in FIG. 17, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU (1575, 1585) or other power management logic to perform processor-based power management. Such processors may further be configured to perform hierarchical routing as described herein.

Still referring to FIG. 17, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 17, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 17, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 17, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

The following Examples pertain to further embodiments.

In one example, a SoC for routing information includes: a plurality of local networks having one or more local endpoints and a first router, where at least some of the one or more local endpoints of different local networks have non-unique port identifiers; at least one global network having one or more global endpoints and at least one second router, where the one or more global endpoints have unique port identifiers; and a plurality of transparent bridges to couple between one of the plurality of local networks and the at least one global network.

In an example, the non-unique port identifiers have a first range of values and the unique port identifiers have a second range of values.

In an example, a first transparent bridge is to receive a first message from a first global endpoint, the first message including a hierarchal routing header and a first header, where the first transparent bridge is to direct the first message to a first router within a first local network coupled to the first transparent bridge based on a first port identifier of the first header.

In an example, the first transparent bridge is to send the first message to the first local endpoint without the hierarchal routing header.

In an example, the first transparent bridge is to receive a second message from the first local network, associate a second hierarchal routing header with the second message, and send the second message with the second hierarchal routing header to the at least one global network.

In an example, the first transparent bridge is to insert a source identifier into the second hierarchical routing header based on strap information.

In an example, the one or more local endpoints are not adapted to support the hierarchal routing header and are adapted to communicate with at least one of the one or more global endpoints.

In an example, a first global endpoint of the one or more global endpoints is addressable based at least in part on a hierarchal routing header of a message.

In an example, the message includes the hierarchal routing header and a first header, the first header having a first portion of a unique port identifier of the first global endpoint and the hierarchal routing header having a second portion of the unique port identifier of the first global endpoint, where the first global endpoint is addressable by at least the second portion of the unique port identifier of the first global endpoint.

In an example, the SoC further includes a hierarchical NoC including the plurality of local networks, the at least one global network and the plurality of transparent bridges.

In an example, the at least one global network is adapted to support N local networks and each of the plurality of local networks is adapted to support N local endpoints.

In an example, at least some of the plurality of transparent bridges are incorporated in a port structure of one or more of the at least second router and the first router of one or more of the plurality of local networks.

In another example, a method for routing packets in a SoC includes: receiving a first packet in a transparent bridge coupled between a global network of the SoC and a first local network of the SoC, the first packet including a global destination identifier having a first bit width; removing a hierarchical routing header of the first packet, the first packet without the hierarchical routing header including a local destination identifier having a second bit width; and sending the first packet to a router of the first local network, the first local network including a first endpoint having the local destination identifier.

In an example, the hierarchical routing header includes a first portion of the global destination identifier and another header of the first packet includes a second portion of the global destination identifier corresponding to the local destination identifier.

In an example, the method further comprises: receiving the first packet in a router of the global network; identifying the transparent bridge as a next stop for the first packet based at least in part on the global destination identifier; and responsive to the identifying, sending the first packet to the transparent bridge.

In an example, the method further comprises: receiving a second packet in the transparent bridge, the second packet including a second local destination identifier for a first global endpoint of the global network; appending a second hierarchical routing header to the second packet in the transparent bridge, the second hierarchical routing header based at least in part on the second local destination identifier; and sending the second packet having the second hierarchical routing header to the global network.

In an example, the method further comprises: assigning a first unique local destination identifier to a first local endpoint of the first local network and assigning a first non-unique local destination identifier to a second local endpoint of the first local network; assigning a second unique local destination identifier to a first local endpoint of a second local network of the SoC and assigning the first non-unique local destination identifier to a second local endpoint of the second local network; communicating a third packet from the first local endpoint of the first local network to the first local endpoint of the second local network, using the second unique local destination identifier; and preventing the second local endpoint of the first local network from communicating outside of the first local network, and preventing the second local endpoint of the second local network from communicating outside of the second local network.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a NoC for routing messages includes: at least one core to execute instructions, a coherent interconnect coupled to the at least one core, and a memory controller coupled to the coherent interconnect; a global network domain including a first global router and a first global agent; a first local network having a first local router and a first local agent; and a first bridge circuit to couple the first global router to the first local router. The first bridge circuit may be configured to receive a first message from the first global agent, the first message including a hierarchal routing header and a first header, where the first bridge circuit is to remove the hierarchal routing header and direct the first message without the hierarchal routing header to the first local agent via the first local router based on a first port identifier of the first header.

In an example, the NoC comprises a sideband network to enable sideband message communication between the first local network and the global network domain, where at least a portion of an address space of the global network domain is transparent to local agents of the first local network.

In an example, the first local network further comprises a first semi-global agent having a first globally unique port identifier, the first semi-global agent to communicate with the one or more agents in the first local network and a second semi-global agent having a second globally unique port identifier in a second local network, and further to communicate with a plurality of global agents of the global network domain.

In yet another example, an apparatus for routing information includes: a plurality of local networks having one or more local endpoint means and a first router means, where at least some of the one or more local endpoint means of different local networks have non-unique port identifiers; at least one global network having one or more global endpoint means and at least one second router means, where the one or more global endpoints have unique port identifiers; and a plurality of transparent bridge means for coupling between one of the plurality of local networks and the at least one global network.

In an example, the non-unique port identifiers have a first range of values and the unique port identifiers have a second range of values.

In an example, a first transparent bridge means is to receive a first message from a first global endpoint means, the first message including a hierarchal routing header and a first header, where the first transparent bridge means is to direct the first message to a first router means within a first local network coupled to the first transparent bridge means based on a first port identifier of the first header.

In an example, the first transparent bridge means is to send the first message to the first local endpoint means without the hierarchal routing header.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system on chip (SoC) comprising:
   a plurality of local networks having one or more local endpoints and a first router, wherein at least some of the one or more local endpoints of different local networks have non-unique port identifiers;
   at least one global network having one or more global endpoints and at least one second router, wherein the one or more global endpoints have unique port identifiers and visibility to the one or more local endpoints of the plurality of local networks, the one or more local endpoints of the plurality of local networks not having visibility to local endpoints outside of a corresponding local network, wherein a first local network comprises a first semi-global endpoint having a first globally unique port identifier, the first semi-global endpoint to communicate with the one or more local endpoints in the first local network and a second semi-global endpoint having a second globally unique port identifier in a second local network, and further to communicate with a plurality of global endpoints of the at least one global network; and
   a plurality of transparent bridges to couple between one of the plurality of local networks and the at least one global network.

2. The SoC of claim 1, wherein a first transparent bridge is to receive a first message from a first global endpoint, the first message including a hierarchical routing header and a first header, wherein the first transparent bridge is to direct the first message to a first router within a first local network coupled to the first transparent bridge based on a first port identifier of the first header.

3. The SoC of claim 2, wherein the first transparent bridge is to send the first message to the first local endpoint without the hierarchical routing header.

4. The SoC of claim 2, wherein the first transparent bridge is to receive a second message from the first local network, associate a second hierarchical routing header with the second message, and send the second message with the second hierarchical routing header to the at least one global network.

5. The SoC of claim 4, wherein the first transparent bridge is to insert a source identifier into the second hierarchical routing header based on strap information.

6. The SoC of claim 2, wherein the one or more local endpoints are not adapted to support the hierarchical routing header and are adapted to communicate with at least one of the one or more global endpoints.

7. The SoC of claim 1, wherein a first global endpoint of the one or more global endpoints is addressable based at least in part on a hierarchical routing header of a message.

8. The SoC of claim 7, wherein the message includes the hierarchical routing header and a first header, the first header having a first portion of a unique port identifier of the first global endpoint and the hierarchical routing header having a second portion of the unique port identifier of the first global endpoint, wherein the first global endpoint is addressable by at least the second portion of the unique port identifier of the first global endpoint.

9. The SoC of claim 1, further comprising a hierarchical network on chip (NoC) including the plurality of local networks, the at least one global network and the plurality of transparent bridges.

10. The SoC of claim 1, wherein the at least one global network is adapted to support N local networks and each of the plurality of local networks is adapted to support N local endpoints.

11. The SoC of claim 1, wherein at least some of the plurality of transparent bridges are incorporated in a port structure of one or more of the at least second router and the first router of one or more of the plurality of local networks.

12. A machine-readable medium having stored thereon instructions, which if performed by a system on chip (SoC) cause the SoC to perform a method comprising:
   receiving a first packet in a transparent bridge coupled between a global network of the SoC and a first local network of the SoC, the first packet including a global destination identifier having a first bit width, a first portion of the global destination identifier to identify the transparent bridge;
   removing a hierarchical routing header of the first packet including the first portion of the global destination identifier, the first packet without the hierarchical routing header including a local destination identifier having a second bit width;
   sending the first packet to a router of the first local network, the first local network including a first endpoint having the local destination identifier;
   assigning a first unique local destination identifier to a first local endpoint of the first local network and assigning a first non-unique local destination identifier to a second local endpoint of the first local network;
   assigning a second unique local destination identifier to a first local endpoint of a second local network of the SoC and assigning the first non-unique local destination identifier to a second local endpoint of the second local network;
   communicating a third packet from the first local endpoint of the first local network to the first local endpoint of the second local network, using the second unique local destination identifier; and
   preventing the second local endpoint of the first local network from communicating outside of the first local network, and preventing the second local endpoint of the second local network from communicating outside of the second local network.

13. The machine-readable medium of claim 12, wherein the hierarchical routing header includes the first portion of the global destination identifier and another header of the first packet includes a second portion of the global destination identifier corresponding to the local destination identifier.

14. The machine-readable medium of claim 12, wherein the method further comprises:
   receiving the first packet in a router of the global network;
   identifying the transparent bridge as a next stop for the first packet based at least in part on the global destination identifier; and
   responsive to the identifying, sending the first packet to the transparent bridge.

15. The machine-readable medium of claim 12, wherein the method further comprises:

receiving a second packet in the transparent bridge, the second packet including a second local destination identifier for a first global endpoint of the global network;

appending a second hierarchical routing header to the second packet in the transparent bridge, the second hierarchical routing header based at least in part on the second local destination identifier; and sending the second packet having the second hierarchical routing header to the global network.

16. A network-on-chip (NoC) comprising:

at least one core to execute instructions, a coherent interconnect coupled to the at least one core, and a memory controller coupled to the coherent interconnect;

a global network domain including a first global router and a first global agent;

a first local network having a first local router, a first local agent, and a first semi-global agent having a first globally unique port identifier, the first semi-global agent to communicate with one or more local agents in the first local network and a second semi-global agent having a second globally unique port identifier in a second local network, and further to communicate with a plurality of global agents of the global network domain; and a first bridge circuit to couple the first global router to the first local router, the first bridge circuit to receive a first message from the first global agent, the first message including a hierarchical routing header and a first header, wherein the first bridge circuit is to remove the hierarchical routing header and direct the first message without the hierarchical routing header to the first local agent via the first local router based on a first port identifier of the first header.

17. The NoC of claim 16, wherein the NoC comprises a sideband network to enable sideband message communication between the first local network and the global network domain, wherein at least a portion of an address space of the global network domain is transparent to local agents of the first local network.

* * * * *